H. SEBREE.
CLOTHES PIN.
APPLICATION FILED FEB. 19, 1915.
1,265,260. Patented May 7, 1918.
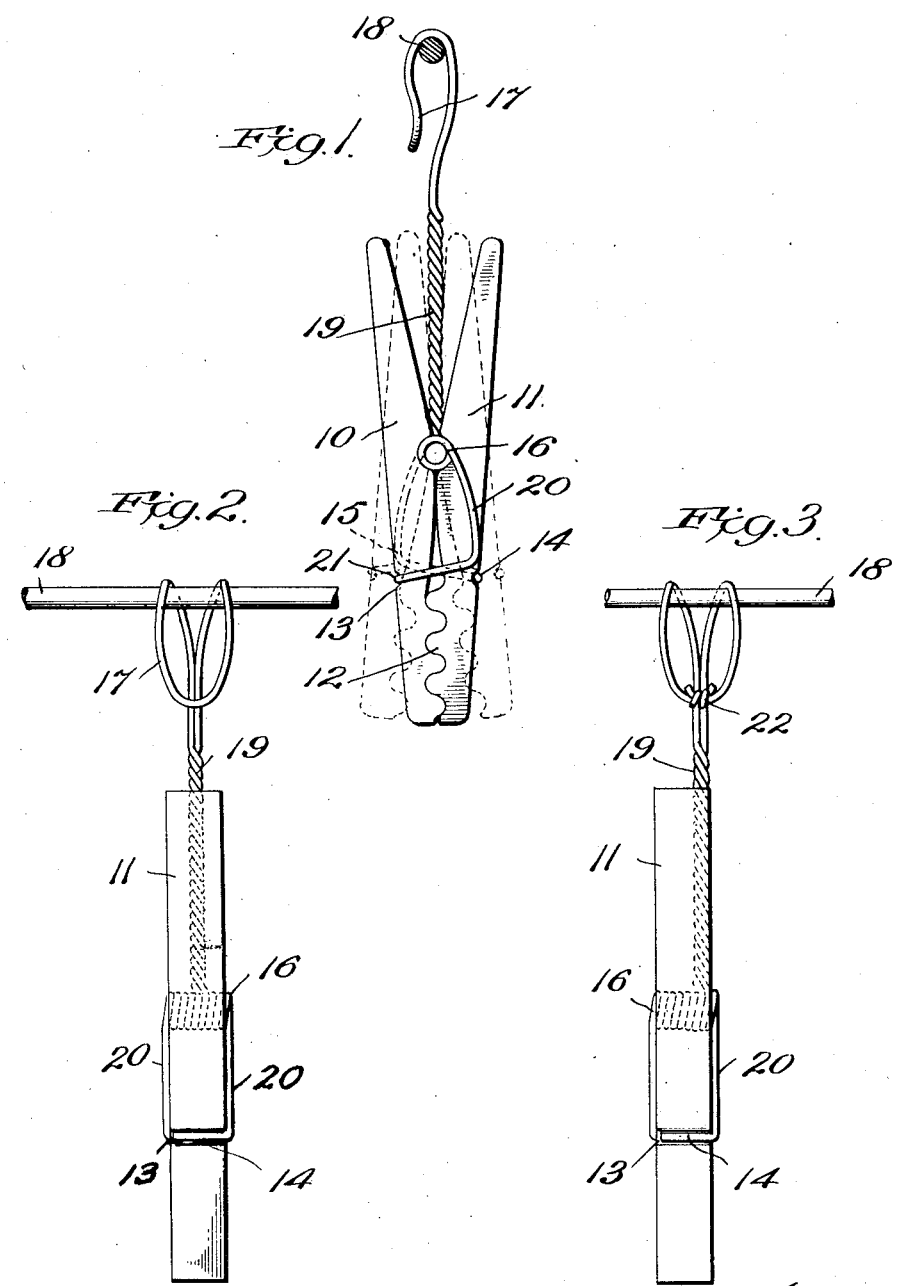

UNITED STATES PATENT OFFICE.

HÉLÈNE SEBRÉE, OF BROOKLYN, NEW YORK.

CLOTHES-PIN.

1,265,260.

Specification of Letters Patent.

Patented May 7, 1918.

Application filed February 19, 1915. Serial No. 9,475.

*To all whom it may concern:*

Be it known that I, HÉLÈNE SEBRÉE, a citizen of the United States, residing at Brooklyn, in the county of Kings and State of New York, have invented certain new and useful Improvements in Clothes-Pins; and I do hereby declare the following to be a full, clear, and exact description of the invention, such as will enable others skilled in the art to which it appertains to make and use the same.

The present invention relates to an improved clothes pin, which can be cheaply made and is simple in use and construction, and is so contrived as firmly to hold clothing, sheets, and the like when hung out to dry without letting them touch the line or rope from which they are hung. By so doing, the soiling of the clothes by contact with blackened lines is prevented.

Certain preferred forms of my invention are shown in the accompanying drawings, wherein Figure 1 is a side elevation, Fig. 2 is a front elevation, and Fig. 3 is a middle section of a modified form.

The device comprises two jaws 10 and 11, substantially of the form shown in Fig. 1, the same being suspended and firmly held together by a single piece of strong spring wire arranged substantially as hereinafter described. The active portion of the jaws intended to grip the clothes is preferably corrugated as shown at 12, in order to afford a more secure hold.

In Figs. 1 and 2 is shown a form in which a single piece of wire is so shaped and associated with the jaws as to provide, not only the gripping force necessary, but to confine the jaws laterally and supply the means for suspension.

Across the back of the active end of each piece 10 and 11 is cut a suitable notch in which lie the respective extremities of the wire.

Starting from the end 14 (Fig. 2) which lies in one of these notches, the wire turns at right angles, and lies across the sides of both jaws, making a turn as shown in dotted lines at 15, whence it extends to form one half of the pivotal coil 16 which lies in a suitably formed portion of the jaws 10 and 11, where they meet.

From the middle of this coil, the wire extends upward to form a loop 17, which is bent laterally to form a hook, as shown clearly in Figs. 1 and 2; which hook is intended to fit over the clothesline 18, which supports the pins and clothes. The wire then extends downward, being preferably twisted around the rising portion to form a shank 19, and then to form the second half of the coil 16. From this coil the wire extends again twice across the sides of the jaws as at 20, and ends in a portion 21, which lies in its appropriate groove 13, across the jaw 10.

It will be seen that the wire thus formed holds the jaws closed upon the clothes to be gripped, and affords a means for suspension. At the same time it firmly confines the sides of the jaws and prevents lateral displacement. The use of the wide loop bent into a hook at the top affords such a bearing on the line as to prevent twisting, and tend to oppose sliding of the hooks along the line.

The opening of the jaws to permit introduction of the clothes between them is accomplished by squeezing together the upper ends of the jaws, as shown in Fig. 1 in dotted lines. I prefer to shape the device (as shown in Fig. 1) so that, when the upper parts of the jaws are squeezed together as far as they will go, the jaws in opening will not move apart far enough to escape the lateral guidance and grasp of the parts 20 of the wire.

In Fig. 3 is shown a modification wherein the rising parts or shank 19 do not leave the coil 16 from the middle thereof, and wherein, also, the two parts of the wire are parted at 22. This would be a practical device, and neither of these departures from the structure already described would avoid the scope of the present invention.

What I claim is—

A clothes pin comprising two separable jaws having active portions and rear extensions diverging in V shape when said active portions are closed, and a spring wire arranged to hold them together, said wire forming a pivotal coil between said jaws, whose ends extend along and across the sides of said active portions and thence across the backs of the same, the intermediate portion of said coil being extended upward in two parts twisted together to form a shank, and opened to form a loop at the top which is bent as a whole to form a suspending hook.

In testimony whereof, I affix my signature, in presence of two witnesses.

HÉLÈNE SEBRÉE.

Witnesses:
 KATHARINE C. MEAD,
 GEO. A. BYRNE.